United States Patent
Judge et al.

(10) Patent No.: US 9,473,452 B1
(45) Date of Patent: Oct. 18, 2016

(54) NAT TRAVERSAL IN VOIP COMMUNICATION SYSTEM

(71) Applicant: 8×8, Inc., San Jose, CA (US)

(72) Inventors: Garth Judge, San Jose, CA (US); Huw Rees, San Jose, CA (US); Zhishen Liu, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 184 days.

(21) Appl. No.: 14/093,226

(22) Filed: Nov. 29, 2013

Related U.S. Application Data

(63) Continuation-in-part of application No. 13/732,605, filed on Jan. 2, 2013.

(51) Int. Cl.
| | |
|---|---|
| *H04L 12/851* | (2013.01) |
| *H04L 29/12* | (2006.01) |
| *H04L 29/06* | (2006.01) |
| *H04M 7/00* | (2006.01) |

(52) U.S. Cl.
CPC ....... *H04L 61/2564* (2013.01); *H04L 65/1046* (2013.01); *H04M 7/006* (2013.01)

(58) Field of Classification Search
CPC .......... H04Q 7/00; H04L 12/66; H04L 12/56
See application file for complete search history.

(56) References Cited

U.S. PATENT DOCUMENTS

| | | | |
|---|---|---|---|
| 7,224,774 B1 | 5/2007 | Brown et al. | |
| 7,826,602 B1* | 11/2010 | Hunyady | ............. H04L 29/125 370/389 |
| 8,228,861 B1 | 7/2012 | Nix | |
| 8,606,884 B2 | 12/2013 | Kim | |
| 2003/0058839 A1* | 3/2003 | D'Souza | ........... H04L 29/06027 370/352 |
| 2004/0005886 A1* | 1/2004 | Oda | ........................ H04L 63/10 455/422.1 |
| 2004/0032862 A1* | 2/2004 | Schoeneberger | ... H04L 41/5064 370/352 |
| 2006/0083199 A1 | 4/2006 | Yang | |
| 2008/0019268 A1 | 1/2008 | Rollins | |
| 2012/0042081 A1 | 2/2012 | Liao et al. | |
| 2012/0281685 A1 | 11/2012 | Kotecha et al. | |

OTHER PUBLICATIONS

International Telecommunications Union, Series P: Telephone Transmission Quality, Telephone Installations, Local Line Networks, ITU-T Recommendation P.862, "Perceptual evaluation of speech quality (PESQ): An objective method for end-to-end speech quality assessment of narrow-band telephone networks and speech codecs," Feb. 2001.

Radvision, "Back-To-Back User Agent (B2BUA) SIP Servers Powering Next Generation Networks: A Functional and Architectural Look at Back-To-Back User Agent (B2BUA) SIP Servers," 2007.

* cited by examiner

*Primary Examiner* — Anez Ebrahim
(74) *Attorney, Agent, or Firm* — Crawford Maunu PLLC

(57) ABSTRACT

Methods, systems, and apparatuses are provided for VoIP communication with endpoint devices via a network address translator (NAT). A plurality of proxy servers is configured to relay communications through mapped paths of the NAT during operations including VoIP sessions through or with the plurality of endpoint devices and during other operations not involving VoIP sessions through or with the plurality of endpoint devices. The mapped paths are susceptible to being unmapped by the NAT if the mapped path is unused for a threshold duration of time. The proxy servers maintain the mapped paths through the NAT by prompting the endpoint devices to communicate data to the plurality of proxy servers. A call control server uses a selection algorithm to select a particular one of the proxy servers to be used for routing communication of a VoIP session between endpoint devices.

9 Claims, 12 Drawing Sheets

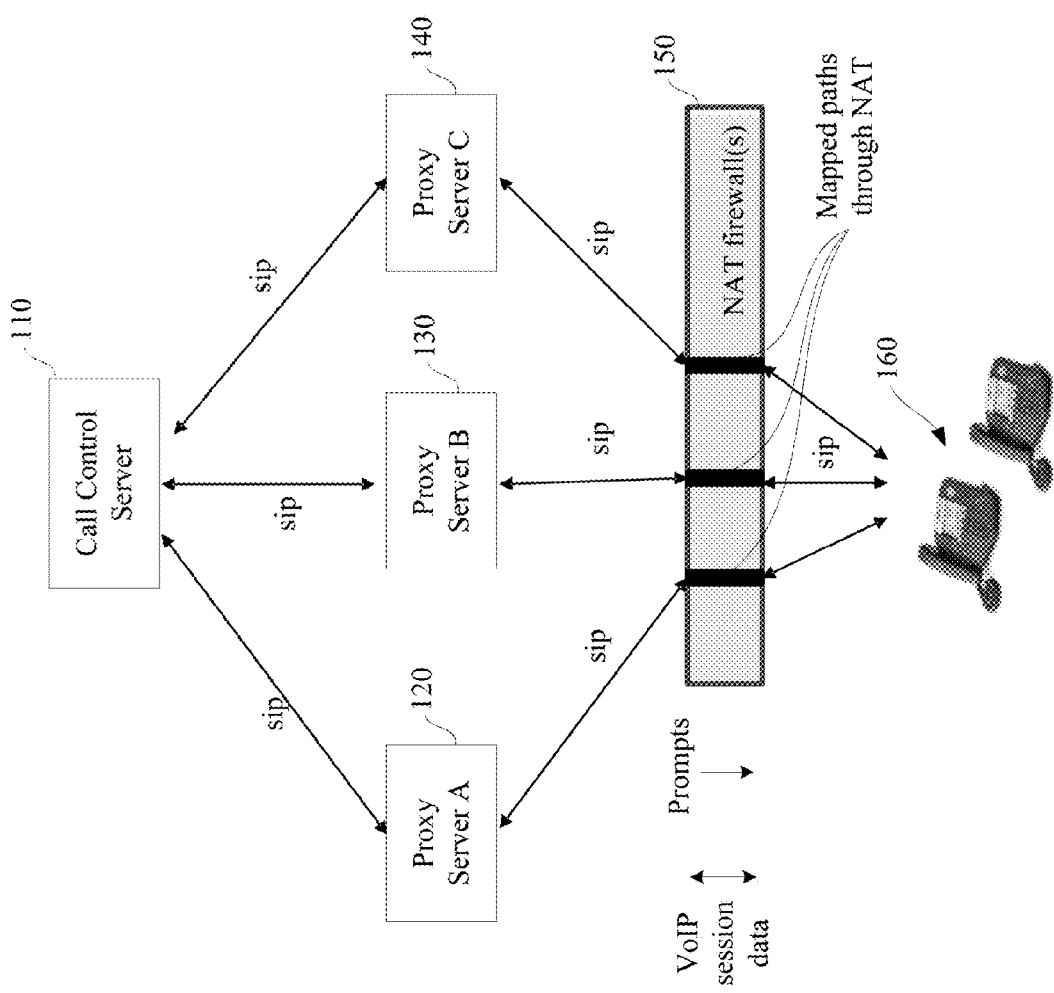

NAT TRAVERSAL IN VOIP COMMUNICATION SYSTEM

CROSS-REFERENCE TO RELATED APPLICATIONS

This application is a continuation-in-part application of U.S. application Ser. No. 13/732,605, filed on Jan. 2, 2013, which is incorporated by reference, in its entirety herein.

FIELD OF THE INVENTION

The present disclosure relates to Voice-over-IP (VoIP) communications.

OVERVIEW

VoIP technology allows for calls to be made using internet connections. VoIP technology can be used in place of traditional analog/digital phone lines and can also be used to supplement traditional phone lines. Depending upon the type of VoIP servers and the VoIP provider's capabilities, VoIP calls can be made between VoIP users and/or to anyone having a telephone number (e.g., calls to local, long distance, mobile, and/or international numbers). VoIP calls can be initiated and received using a general purpose computer (e.g., using software that provides a soft phone interface), specialized hardware (e.g., a VoIP-enabled telephone), or specialized interface equipment (e.g., a VoIP adapter for an analog telephone).

SUMMARY

Aspects of the present disclosure are directed to an apparatus and method for communication with endpoint devices via a network address translator (NAT). These and other aspects of the present disclosure are exemplified in a number of implementations and applications, some of which are shown in the figures and characterized in the claims section that follows.

In one or more embodiments, an apparatus is provided for VoIP communication with endpoint devices. The apparatus includes a plurality of proxy servers located at geographically disparate locations relative to one another. The plurality of proxy servers are configured to relay VoIP data to and from a plurality of endpoint devices. The plurality of proxy servers are also configured to perform network-address-translator traversal services for the plurality of endpoint devices. The apparatus also includes a call control server configured to receive a connection request for a VoIP call, the connection request including a source identifier and a destination identifier, and select a particular proxy server of the plurality of proxy servers using a selection algorithm. In response to the selection, the call control server route s voice media for the VoIP call through the particular proxy server to an endpoint device indicated by the destination identifier. The call control server is also configured to maintain a call state for the VoIP call while the voice media is routed through the particular proxy server.

In some implementations, the plurality of proxy servers perform network-address-translator traversal services for an endpoint device by maintaining a mapped path from the particular proxy server, through a network-address-translator, to the endpoint device. For instance, in one implementation, the proxy servers are configured to relay VoIP data to and from the endpoint devices through respective mapped paths through the network-address-translator. Each of the mapped paths is susceptible to being unmapped by the network-address-translator in response to the mapped path being unused for a threshold duration of time. In response to an endpoint device not communicating with the proxy servers for a duration of time exceeding the threshold duration of time, the proxy servers prompt the endpoint device to transmit one or more messages to the plurality of proxy servers in order to maintain a respective one of the mapped paths through the network-address-translator to the endpoint device.

In some embodiments, a system for VoIP communication is provided. The system includes a NAT and a plurality of endpoint devices communicatively connected to a local area network (LAN) side of the NAT. The system also includes a set of proxy servers communicatively connected to a wide area network (WAN) side of the NAT. The set of proxy servers is configured to register each of the endpoint devices with the set of proxy servers. For each of the endpoint devices, the set of proxy servers is also configured to relay communications to and from the endpoint device through a respective mapped path of the NAT. Each of the mapped paths is susceptible to being unmapped by the NAT if the mapped path is unused for a threshold duration of time.

The set of proxy servers is configured to maintain the mapped paths through the NAT to the endpoint device by prompting the endpoint devices to communicate data to the set of proxy servers. More specifically, an endpoint device is prompted to communicate one or more messages to the set of proxy servers if the endpoint device does not communicate with the set of proxy servers for a duration of time exceeding the threshold duration of time. The system also includes a call control server. In response to receiving a connection request for a VoIP call, the call control server selects a particular proxy server of the proxy servers using a selection algorithm. The call control server routes voice media for the VoIP call through the particular proxy server to an endpoint device indicated by the destination identifier. The call control server also maintains a call state for the VoIP call while the voice media is routed through the particular proxy server.

In some embodiments, a method is provided for communicating with a plurality of endpoint devices via a NAT. Using a call control server a connection request for a VoIP call is received, the connection request including a source identifier and a destination identifier. Using the call control server, a particular proxy server is selected for the VoIP call from a plurality of proxy servers using a selection algorithm. Using the particular proxy server communications are relayed through a mapped path of a NAT during VoIP sessions with an endpoint device indicated by source identifier. The mapped path is susceptible to being unmapped by the NAT in response to the mapped path being unused for a threshold duration of time. In response to the endpoint device not communicating with the particular proxy servers for a duration of time exceeding the threshold duration of time, the particular proxy server is used to prompt the endpoint device to transmit one or more messages to one of the particular proxy servers in order to maintain the mapped path through the network address translator to the endpoint device.

BRIEF DESCRIPTION OF THE DRAWINGS

The invention may be more completely understood in consideration of the following detailed description of various embodiments of the invention in connection with the accompanying drawings, in which:

FIG. 1A shows a VoIP system having a set of proxy servers configured for server-side NAT traversal;

Figure 1B:
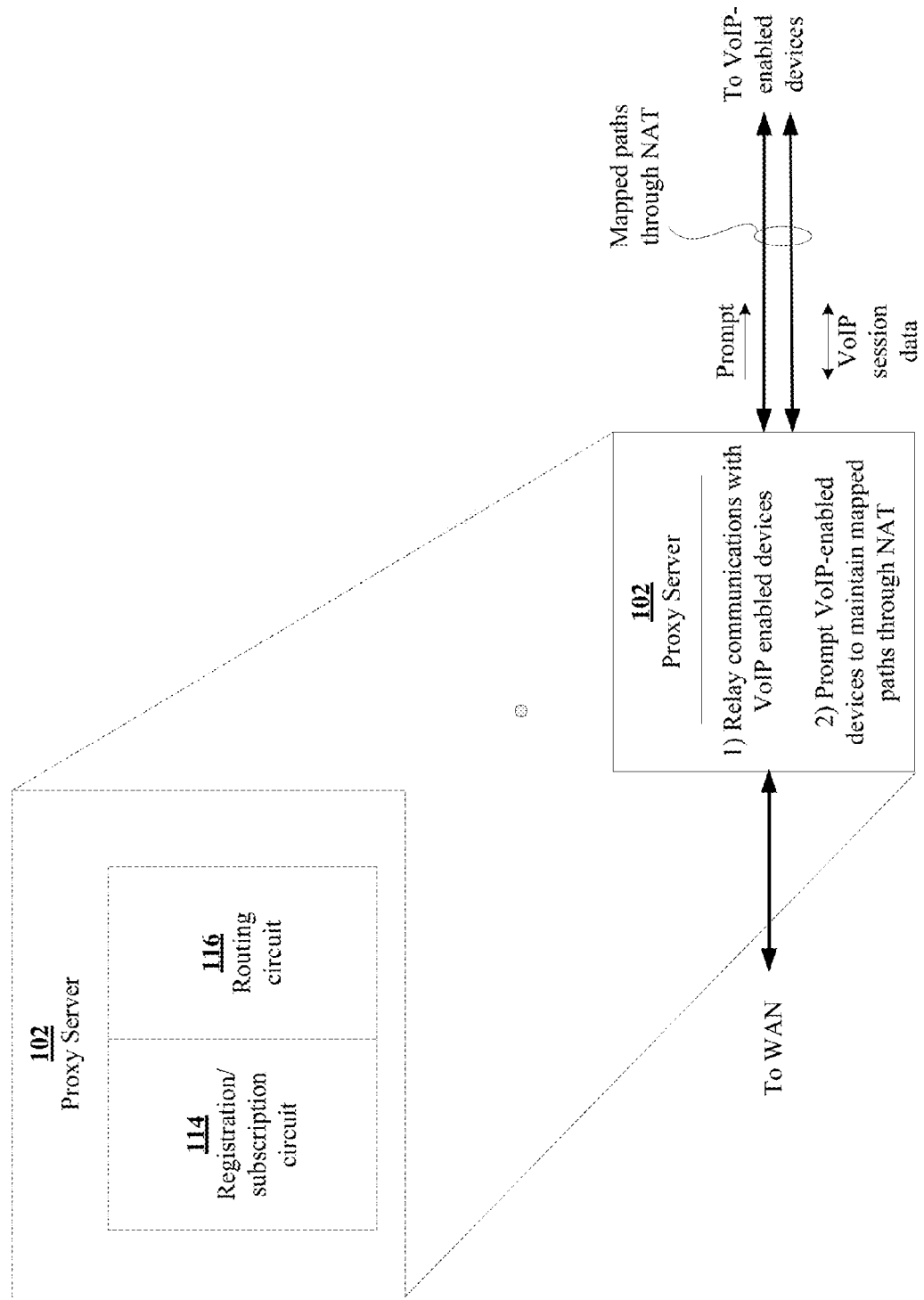
FIG. 1B shows a proxy server configured for server-side NAT traversal.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various methods, systems, and apparatuses for communication with end-point devices (e.g., VoIP-enabled devices) though a NAT. For ease of explanation, the examples and embodiments herein are primarily described with reference to communication of VoIP data between endpoint devices. While the disclosed embodiments are not necessarily limited to such applications, various aspects of the present disclosure may be appreciated through a discussion of various examples using this context.

Endpoint devices may initiate or receive VoIP calls. For ease of reference, a VoIP call may be referred to as a VoIP session and such terms may be used interchangeably herein. Proxy servers may be included in call-routing paths between endpoint devices and act as intermediaries to forward media data and control signals between endpoint devices. The control signals may be used, for example, to initiate and configure various parameters of VoIP sessions. A proxy server may include, for instance, a call control server, a Session Border Control (SBC) server, an IPPBX, or a Contact Center application. A proxy server may help to facilitate call setup and configuration using an appropriate control protocol (e.g., the Session-Initiation-Protocol (SIP)) and also include a media-relay server (MRS) for forwarding media data (e.g., real-time protocol (RTP) data). For instance, the MRS can convert received audio media in transit, so that endpoint devices may communicate using different transmission protocols. SIP signaling function of a proxy server may be performed by, e.g., an SIP back-to-back user agent (B2BUA), which is linked with the MRS and can oversee and provide additional control and value-added features (e.g., billing, automatic call disconnection, and/or call transfer).

In some various disclosed embodiments, SIP BSBUA and MRS functionality is distributed across a plurality of proxy servers. Use of multiple proxy servers allows a high traffic load to be distributed among several servers, and provides redundancy to remove single points of failure and improve reliability. Use of multiple distributed proxies may also be used to improve scalability and availability of service.

In some various disclosed embodiments, the proxy servers also provide a mechanism for managing connections with endpoint devices through a NAT. NATs are used in many networks to allow multiple devices LAN side of the NAT to communicate data via a single IP address on a WAN side of the NAT. For each connection initiated by the endpoint devices, a mapped path is created and maintained by the NAT for a limited period of time. Data may be communicated back to the initiating device using the mapped path.

NATs can create a problem for VoIP applications because endpoint devices may be idle for long periods (in-between calls) beyond those that NATs are designed to maintain. If the mapped path to an endpoint device is not maintained, it will not be possible to route incoming VoIP calls to the endpoint device. In some VoIP systems, endpoint devices are preconfigured to periodically transmit data to a specific proxy server used by a VoIP service provider in order to maintain a mapped path through the NAT. In contrast to this approach, some disclosed embodiments use a set of proxy servers to maintain mapped paths through a NAT. The proxy servers are also used to route VoIP data to and from VoIP devices. In some embodiments, proxy servers are configured to maintain mapped paths through the NAT by prompting the endpoint devices to communicate responses to the proxy servers. As a result of communicating the responses to the proxy servers through the NAT, the mapped paths are maintained. For ease of reference, maintaining mapped paths of a NAT by use of a server(s) to prompt endpoint devices to communicate responses may be referred to a server-side NAT traversal.

In one or more embodiments, an apparatus is provided for VoIP communication with endpoint devices in a VoIP system via a NAT. The apparatus includes a set of proxy servers configured to relay communications through mapped paths of the NAT during operations including VoIP sessions through or with the plurality of endpoint devices and during other operations not involving VoIP sessions through or with the plurality of endpoint devices. The mapped paths are susceptible to being unmapped by the NAT if the mapped paths are not used for a threshold duration of time. The apparatus maintains the mapped paths through the NAT to the endpoint device by prompting the endpoint device to communicate data to the set of proxy servers. More specifically, an endpoint device is prompted to communicate data to the set of proxy servers if the endpoint device does not communicate with the set of proxy servers for a duration of time exceeding the threshold duration of time. The proxy servers are configured to prompt the endpoint device within a timeframe sufficient to prevent the respective one of the mapped paths the NAT to the endpoint device from being unmapped by the NAT.

The endpoint devices may be configured to register with one of the set of proxy servers. For each proxy server, a list is maintained that indicates which of the endpoint devices is registered with the proxy server. The list may also indicate a period of time for which each endpoint device is registered. In one implementation, an endpoint device is added to a registration list for a proxy server in response to an SIP register message being communicated from the endpoint device to the proxy server. The endpoint device is removed from the registration list of a proxy server in response to either the registration of the VoIP device expiring. In some implementations, the endpoint device may also be removed from the registration list of a proxy server in response to a new SIP dialog being initiated by the endpoint device through another proxy server.

In one implementation, each of the set of proxy servers includes a registration/subscription circuit configured to maintain a list of the plurality of endpoint devices registered with the proxy server. The registration/subscription circuit is also configured to perform the prompting of the endpoint device to maintain the mapped paths through the NAT. Each proxy also includes a routing circuit configured and arranged to relay the communications during the VoIP sessions with the VoIP devices using the mapped paths.

In some embodiments, the apparatus further includes a call control server configured to route incoming calls to VoIP devices based on the registration of the devices with the proxy servers. In some implementations, the call control server is configured to receive a connection request for a VoIP call that includes a source identifier and a destination identifier. The call control server selects a particular proxy server using a selection algorithm and routes voice media for the VoIP call through the particular proxy server to an endpoint device indicated by the destination identifier. For instance, in some implementations, in response to an incoming VoIP call to an endpoint device, the call control server determines the proxy server with which the endpoint device is registered, and routes the incoming VoIP session to the determined proxy server. The call control server may also be configured to maintain a call state for the VoIP call while the voice media is routed through the particular proxy server.

In some embodiments, each proxy server is configured to maintain a timer indicating a duration of time since the endpoint device registered/subscribed with the set of proxy servers, and to prompt the endpoint device to transmit a communication to the proxy server in response to the duration of time indicated by the timer exceeding a threshold amount of time. In response to the endpoint device initiating one or more SIP dialogs through a proxy server, with which the endpoint device is not currently registered or subscribed, the proxy server is configured to use the SIP dialog to maintain a respective one of the mapped paths through the NAT until an end of the SIP dialog. An SIP dialog may be initiated and controlled using a number of SIP messages, including, e.g., SIP initial invite, re-invite, keep-alive, and bye for termination. For instance, in some embodiments, SIP options messages may be used to prompt an endpoint device to provide a response message to a proxy server.

In some embodiments, systems for VoIP communication are provided that include the NAT, the endpoint devices, the proxy servers, and/or the call-control server, in various combinations. For example, one such system includes a NAT, endpoint devices, proxy servers, and/or a call-control server. Another such system includes proxy servers and a call-control server configured to communicate with a plurality of third party endpoint devices connected to a third party NAT.

Turning now to the figures, FIG. 1A shows a VoIP system having a set of proxy servers configured for server-side NAT traversal. The system includes a NAT 150 and a plurality of endpoint devices 160 communicatively connected to a LAN side of the NAT. The system also includes a set of proxy servers 120, 130, and 140 communicatively connected to a WAN side of the NAT. The set of proxy servers is configured to register each of the endpoint devices with the set of proxy servers. For each of the endpoint devices, the set of proxy servers is also configured to relay communications to and from the endpoint device through a respective mapped path of the NAT.

In this example, each of the endpoint devices 160 is connected to the same NAT 150. However, the system may include multiple NATs with some endpoint devices connected to one NAT and some other endpoint devices connected to another NAT. For ease of illustration and explanation, the examples herein are primarily described with reference to endpoint devices 160 connected to the same NAT (e.g., NAT 150).

The proxy servers 120, 130, and 140 are configured to maintain the mapped paths through the NAT to the endpoint devices 160 by prompting the endpoint devices to communicate data to the set of proxy servers. More specifically, an endpoint device is prompted to communicate one or more messages to the set of proxy servers, in response to the endpoint device not communicating with the set of proxy servers for a duration of time exceeding the threshold duration of time.

In this example, the system also includes a call control server 110. The call control server 110 is configured to determine a proxy server that an endpoint device is registered with in response to an incoming VoIP session to the endpoint device. The call control server routes the incoming VoIP session to the VoIP device via the determined proxy server.

FIG. 1B shows a proxy server configured for server-side NAT traversal. The proxy server may be used, for example, to implement the proxy servers 120, 130, and 140 shown in FIG. 1A. The proxy server 102 includes a routing circuit 116 configured to relay communications between endpoint devices (not shown in FIG. 1B) connected to a NAT (not shown in FIG. 1B) and other VoIP devices communicatively connected to the proxy server 102 via a WAN (e.g., the internet). As indicated above, the mapped paths are susceptible to being unmapped by the NAT if the mapped paths are not used for a threshold duration of time.

The proxy server 102 maintains the mapped paths through the NAT to the endpoint device by prompting the endpoint devices to communicate data to the set of proxy servers. In this example, the proxy server 102 includes a registration/subscription circuit 114 configured to maintain a list of the plurality of endpoint devices registered with the proxy server. The registration/subscription circuit 114 is also configured to maintain the mapped paths through a NAT for endpoint devices that are registered with the proxy server, or that have initiated an SIP dialog (e.g., a VoIP session) with the proxy server 102.

The registration/subscription circuit 114 is configured to maintain a mapped path through a NAT prompt for an endpoint device by prompting the endpoint devices to transmit a response message if the endpoint device does not communicate any data to the proxy server 102 for the threshold duration of time. For example, in some implementations, the registration/subscription circuit 114 is configured to periodically prompt each of the endpoint devices currently registered with the proxy server 102 based on a respective timer. The registration/subscription circuit 114 may stop prompting a registered endpoint device after registration has expired. In some implementations, the registration/subscription circuit 114 may also stop prompting a registered endpoint if the endpoint device initiates an SIP dialog or registers with a different proxy server.

In some implementations, the registration/subscription circuit 114 may also maintain a mapped path for an unregistered endpoint device that has initiated an SIP dialog with the proxy server 102. For instance, during an SIP dialog with the endpoint device, the registration/subscription circuit 114 may prompt the endpoint device to send a response if a communication has not been received from the endpoint device for a threshold period of time.

Figure 2:
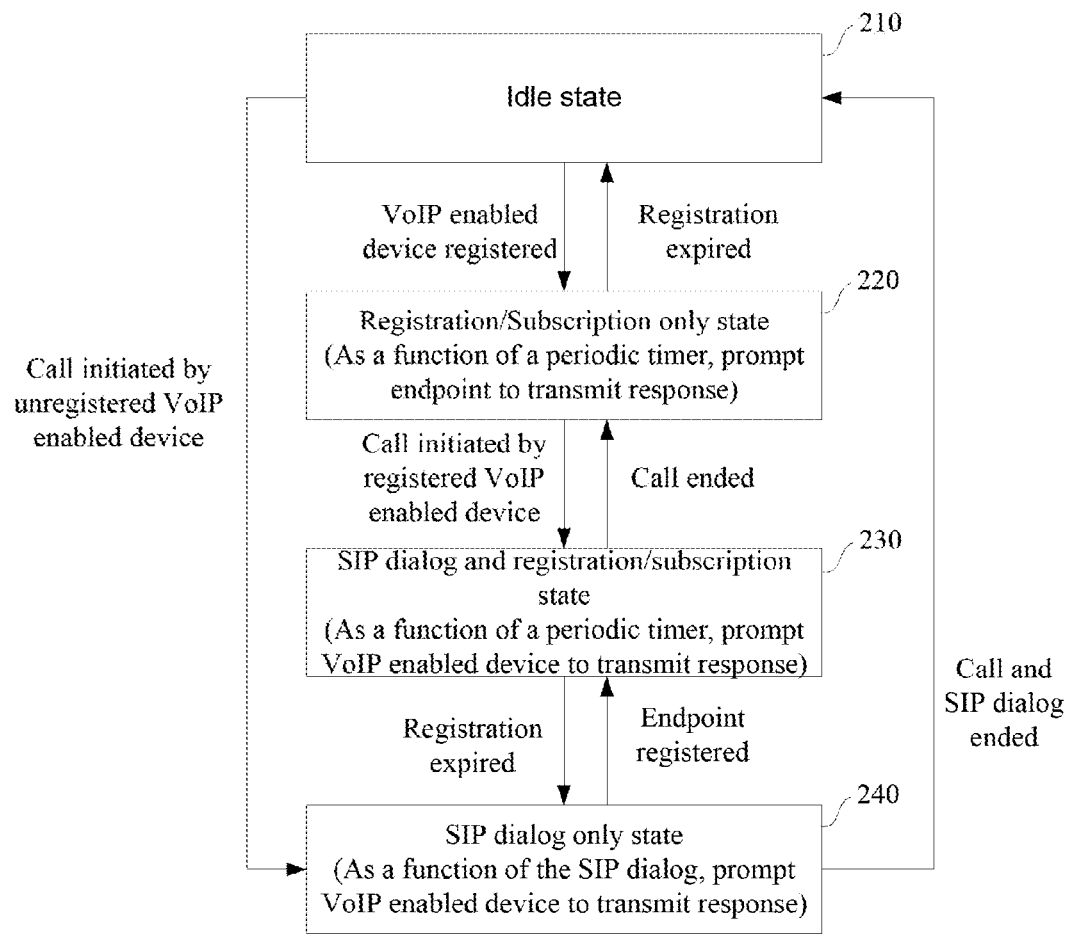
FIG. 2 shows a state-machine for operating a proxy server, in accordance with one or more disclosed embodiments.

FIG. 2 shows a state-machine for operating a proxy server, in accordance with one or more disclosed embodiments. The proxy server is initially operated in an idle state 210. In response to an endpoint device being registered, the proxy server transitions from the idle state to a registration/subscription only state 220. While operating in the registration-only state 220, the proxy server prompts the registered endpoint device, as a function of a periodic timer, to transmit a response to the proxy server. The transmitted response causes the NAT to maintain a mapped path between the proxy server and the endpoint device.

If a registered endpoint device initiates a VoIP session, the proxy transfers from the registration/subscription only state 220 to an SIP dialog and registration state 230. In the SIP dialog and registration state 230, the proxy server continues to prompt the endpoint device, as a function of a periodic timer.

If registration of the endpoint device expires while the proxy server is operating in the SIP dialog and registration state 230, the proxy server begins operating in SIP dialog only state 240. The proxy server may also begin operating in the SIP dialog only state 240 if a call is initiated by an unregistered device. While operating in the SIP dialog only state, the proxy server prompts the endpoint device to send keep-alive responses based on the SIP dialog duration. For instance, the proxy server may prompt the endpoint device to provide a response if the SIP dialog has not ended and a communication has not been received from the endpoint device for a threshold period of time. Once the SIP dialog ends, the proxy server stops prompting the endpoint device and transitions back to the idle state 210.

If the endpoint device renews registration while operating in the SIP dialog only state, the proxy server transitions back to the SIP dialog and registration state 230. If the endpoint device is still registered when the SIP dialog ends while operating in the SIP and registration state 230, the proxy server transitions back to the registration/subscription only state 220. If registration of the endpoint device expires while operating in the registration/subscription only state 220, the proxy server transitions back to the idle state 210.

As described above, proxy servers maintain mapped data paths from the NAT so that both incoming and outgoing messages can be communicated to/from the endpoint device. However, when multiple proxy servers are used, as shown in FIG. 1A, an endpoint device may register with and/or initiate SIP dialogs with multiple ones of the proxy servers, thereby creating multiple mapped paths through the NAT. For instance, an endpoint device can register to a domain configured as DNS A or SRV record, which has the list of N proxy servers within. In this scenario, the endpoint device may register to any of the N servers at one time and switch to another server during the next registration interval. The path switch typically depends on the SIP registration expiration timer, and DNS record Time-To-Live (TTL) setting. The SIP registration path may not be the same as the SIP dialog path. For example, SIP INVITE can both create SIP dialog. The SIP dialog may choose a different path from SIP registration. All SIP messages for an SIP dialog need to stay on the dialog path created. Each SIP signaling path created by an SIP registration or SIP dialog may create a new mapped path in the NAT.

In some embodiments, the distributed proxy servers keep track of both SIP registration paths and SIP dialog paths, and prompt the endpoint devices to keep the corresponding mapped paths through the NAT open for the duration of SIP registrations or SIP dialogs. As indicated above, endpoint devices may be prompted to communicate responses to the proxy servers by communicating SIP option messages to the endpoint devices.

In some instances, the SIP dialog path may happen to merge into the same path as SIP registration and only one mapped path need be maintained. In some other instances, the SIP dialog path and the registration path can fork to different paths requiring the creation of separate mapped paths through the NAT. Multiple SIP registrations or subscriptions may also merge into the same path or fork to different paths. There can be multiple SIP dialogs created by INVITE messages. The dialogs may all choose the same path or different paths.

The distributed proxy servers keep track of all the paths being used to communicate SIP dialogs and the paths used to register the endpoint devices. The proxy servers are configured to only send one message prompt at one time per path to the same endpoint device.

As described with reference to FIG. 2, the prompting performed by each proxy server depends on whether the VoIP device has initiated an SIP dialog with the proxy server and whether the SIP device is registered/subscribed with the proxy. For endpoint devices that are registered/subscribed with a proxy server, the proxy server may prompt the endpoint device according to a periodic timer until the registration/subscription expires. For unregistered devices that have initiated an SIP dialog through the proxy server, the proxy server may prompt the endpoint device as required to maintain the mapped path, used by the SIP dialog, for the duration of the SIP dialog. When an SIP dialog has concluded (e.g., when no more SIP messages are communicated on the SIP dialog path), the corresponding proxy server stops prompting the endpoint device for responses.

Figure 3A:
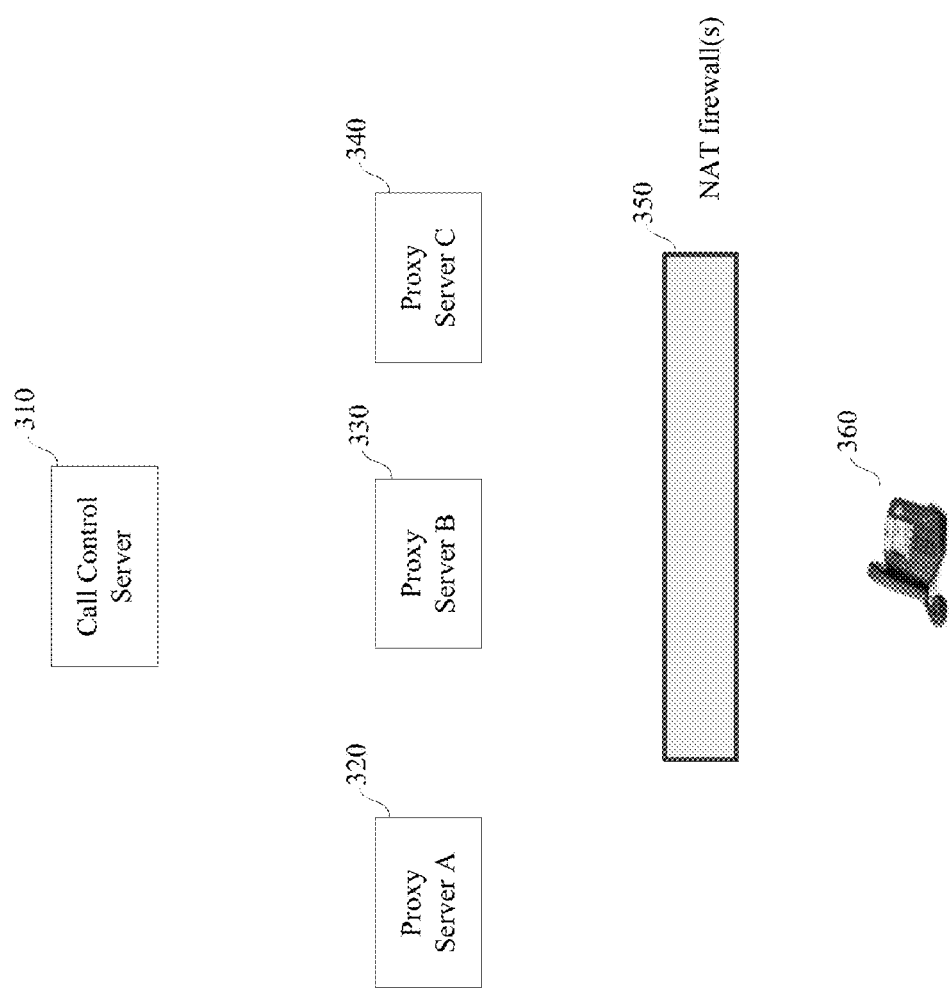
FIGS. 3A-3F illustrate an example communication scenario in a VoIP system.

FIGS. 3A-3F each illustrates an example communication scenario in a VoIP system. The VoIP system is similar to that shown in FIG. 1A. FIG. 3A shows components of the system without any SIP registrations or SIP dialogs initiated. The system includes an endpoint device 360 communicatively connected to a LAN side of a NAT 350. A set of proxy servers 320, 330, and 340 is communicatively connected to a WAN side of the NAT. The set of proxy servers is configured to route data to and from the endpoint device 360 through the NAT. As described above, the proxy servers are configured to maintain mapped paths through the NAT that are used for SIP registration/subscription and/or SIP dialogs initiated by the endpoint device 360. The system also includes a call control server 310 configured to route incoming VoIP calls to an appropriate one of the proxy servers with which the endpoint device 360 is registered.

Figure 3B:
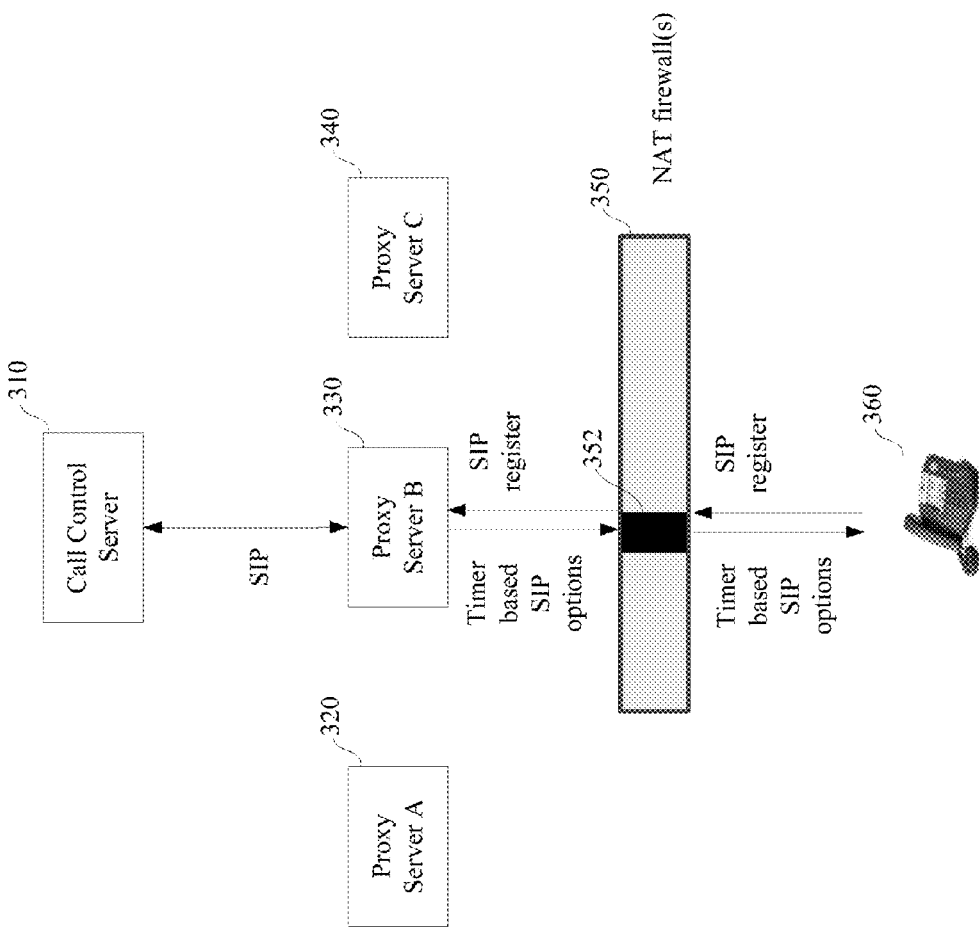

In FIG. 3B, the endpoint device 360 communicates an SIP registration message to proxy server B 330. The SIP registration message causes the NAT to create a mapped path 352 between the endpoint device 360 and the proxy server B 330. In response to the SIP registration message, the proxy server B 330 registers the endpoint device. The proxy server B 330 also transmits SIP options messages based on a periodic timer, until registration expires. The SIP options messages prompt the endpoint device to send responses—thereby maintaining the mapped path 352. SIP data is also communicated to call control server 310 to update registration data of the call control server 310 and/or provide control commands to the active proxy servers.

Figure 3C:
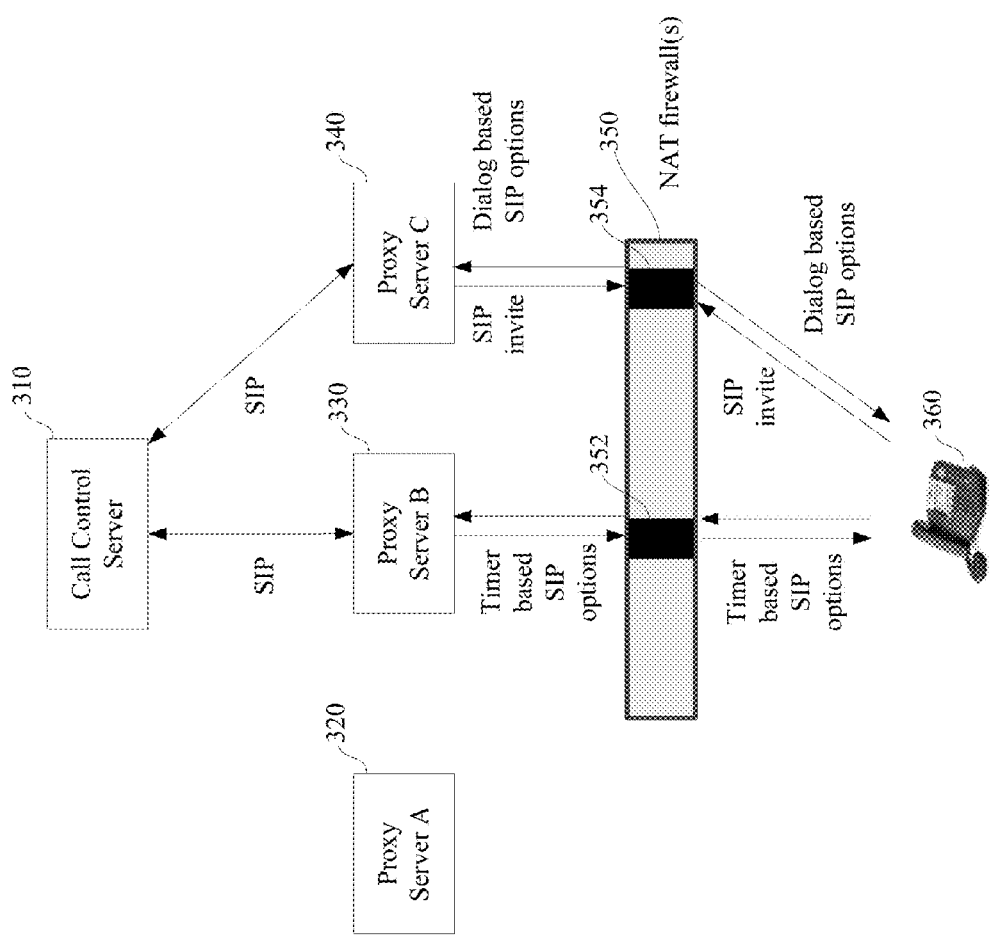

In FIG. 3C, the endpoint device 360 initiates an SIP dialog by transmitting an SIP invite message via proxy server C 340. The SIP invite message causes the NAT to create another mapped path 354 between the endpoint device 360 and the proxy server C 340. The SIP invite message causes the proxy server C 340 to transmit SIP options messages, while the SIP dialog is active, to prompt the endpoint device 360 to send responses and thereby maintain the mapped path 354. The proxy server B 330 continues to transmit SIP options messages to maintain mapped path 352 until the registration of the endpoint device 360 with proxy server B 330 expires. SIP data is also communicated to call control server 310 to update registration data of the call control server 310 and/or provide control commands to the active proxy servers.

Figure 3D:
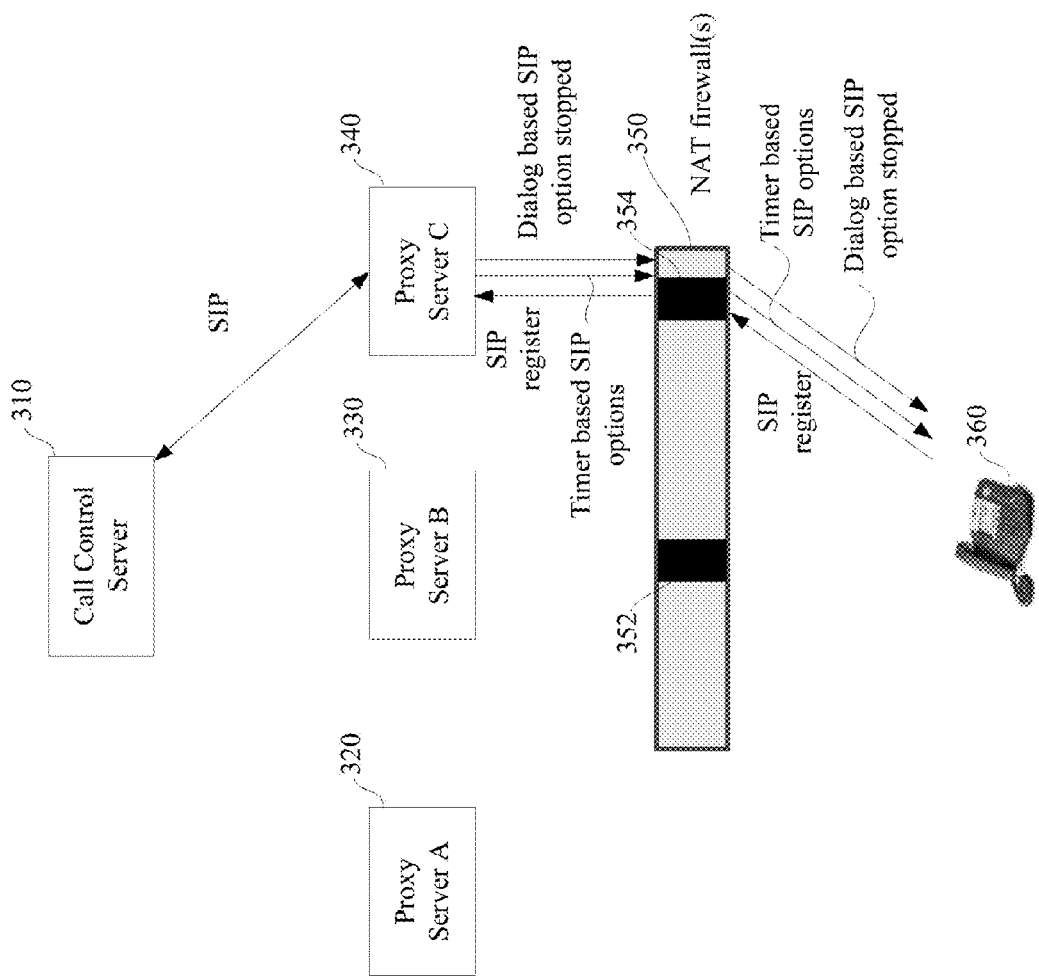

In FIG. 3D, the registration of the endpoint device 360 with proxy server B 330 has expired and the proxy server no longer sends SIP options messages to prompt the endpoint device 360 to send responses. Note, that the NAT 350 may still maintain the mapped path 352 for a threshold period of time.

In FIG. 3D, the endpoint device communicates an SIP registration message to proxy server C 340. In response to the SIP registration message, proxy server C 340 registers the endpoint device 360. As described with reference to FIG. 2, following the registration, the proxy suspends transmitting SIP options, as a function of the SIP dialog, to maintain the mapped path 354. Instead, the proxy server begins transmitting SIP options as a function of a periodic timer in order to maintain the mapped path 354 while the registration is active. SIP data is also communicated to call control server 310 to update registration data of the call control server 310 and/or provide control commands to the active proxy servers.

Figure 3E:
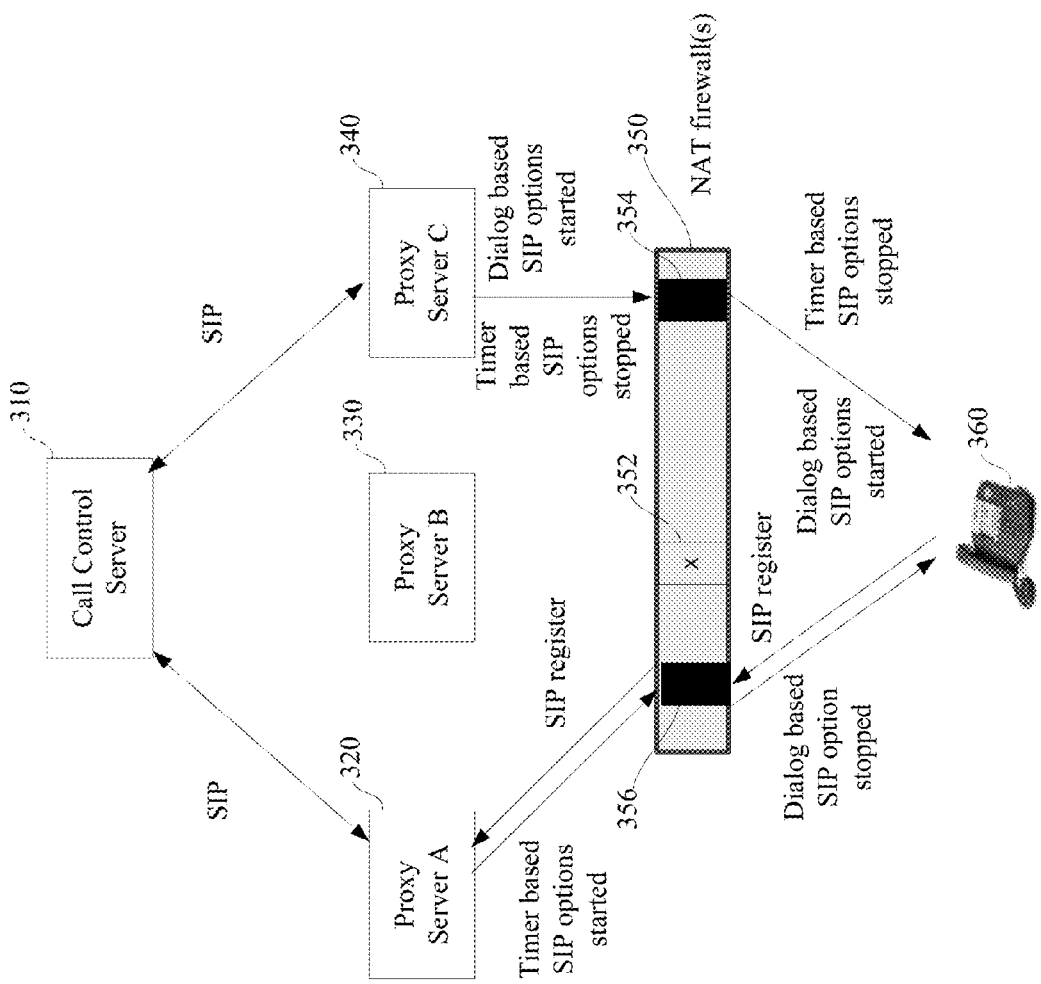

In FIG. 3E, path 352 is unmapped by the NAT. The proxy server C 340 stops transmitting SIP options messages as a function of a periodic timer when the registration timer expires on the path, but it resumes to transmit SIP options messages to the endpoint device 360, as a function of an active SIP dialog, to maintain the mapped path 354 while the SIP dialog of the endpoint device 360 remains active. The endpoint device 360 communicates an SIP registration message to proxy server A 320. The SIP registration message causes the NAT to create another mapped path 356 between the endpoint device 360 and the proxy server A 320. In response to the SIP registration message, the proxy server A 320 registers the endpoint device and begins transmitting SIP options messages based on a periodic timer, until the registration expires. SIP data is also communicated to call control server 310 to update registration data of the call control server 310 and/or provide control commands to the active proxy servers.

Figure 3F:
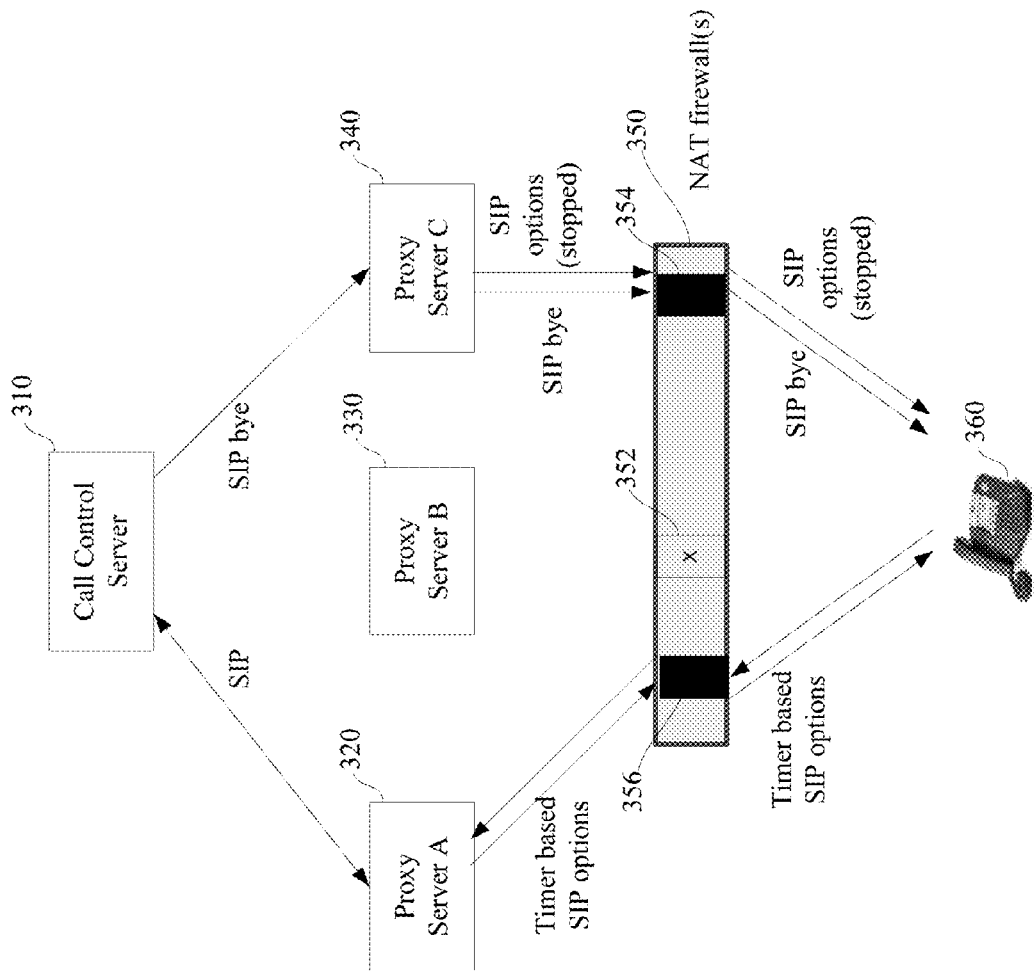

In FIG. 3F, the proxy server C 340 receives an SIP bye message, via the call control server 310. Proxy server C 340 forwards the SIP bye message to the endpoint device, which terminates the SIP session. At this time, SIP dialog is ended so that proxy server C 340 stops transmitting SIP options messages to the endpoint device 32 seconds (a configurable timer) after the SIP dialog is ended and the mapped path 354 is allowed to be unmapped by the NAT. However, the endpoint device 360 is still registered with proxy server A 320, which continues to communicate SIP options messages based on a periodic timer in order to maintain the mapped path 356 while the registration is active.

Figure 4:
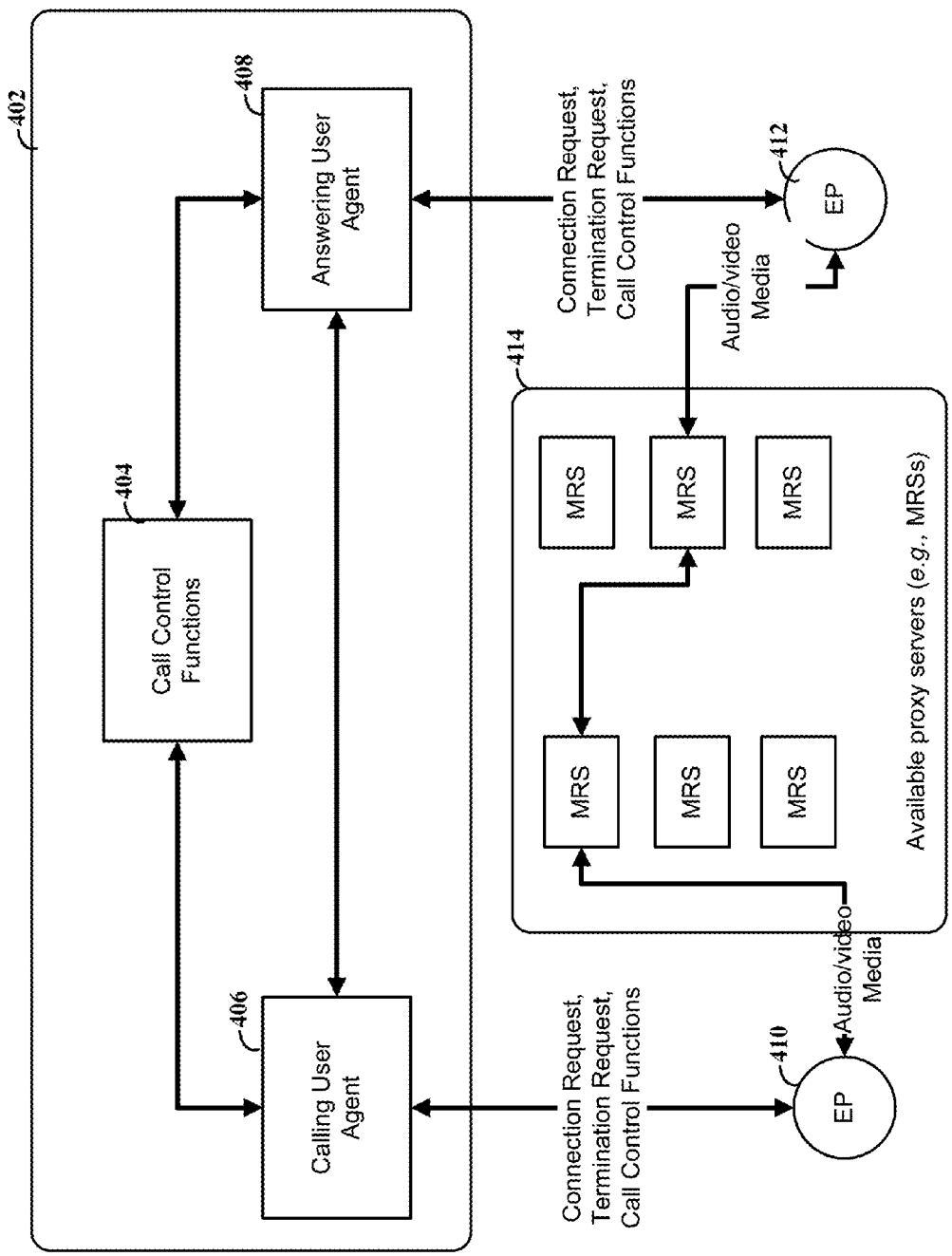
FIG. 4 shows a system for establishing a call between two endpoint devices by selecting between geographically disparate proxy servers, consistent with embodiments of the present disclosure.

FIG. 4 shows a system for establishing a call between two endpoint devices by selecting between geographically disparate proxy servers, consistent with embodiments of the present disclosure. In this example the available proxy servers 414 includes a plurality of MRSs. Call control server 402 can be configured and arranged to provide various call control functions 404. At a basic level, the call control functions include call setup and teardown, but the call control functions can include a variety of additional features. Call control server 402 can operate using SIP. The use of SIP, however, is not required in all embodiments and various other call control protocols can be used. Call control server 402 can provide both calling user agent 406 and answering user agent 408 for respective endpoint devices 410 and 412. Thus, call control server 402 divides a call into two separate legs. Accordingly, certain embodiments are directed toward a call control server 402 that operates as a B2BUA or an IP Private Branch Exchange (PBX).

When calling endpoint 410 attempts to initiate a call, it sends a call request to call control server 402. Call control server then interfaces with the calling endpoint using calling user agent 406. The call control server can then set up the second leg of the call by establishing answering user agent 408 and attempting to contact answering endpoint 412. As part of the call setup, call control server 402 is configured and arranged to select from the available proxy servers 414. FIG. 1 depicts a separate proxy server for each of the calling endpoints 410; however, a single proxy server can be used to carry out a call.

The call control server 402 can be configured to send instructions to the selected proxy server in order to establish the media relay/routing logic between the caller and called parties. The instructions can include the identification of a control protocol. The control protocol can define how, amongst other things, the proxy server is to: establish, control, modify and tear down media relay sessions; provide media transcoding and/or encryption/decryption instructions, and/or retrieve media statistics and call quality metrics for a relay session.

Consistent with certain embodiments, a proxy server (e.g., a MRS) can provide encryption/decryption capabilities for the transmitted audio (video, etc.) media. For example, the call control server 402 can instruct a proxy server to encrypt the transmitted media between the caller and the proxy server, but not to encrypt the media from the proxy server to the called party, and vice-versa. Other instructions might specify different encryption parameters/methods for either leg of the call flow on either side of the proxy server. This can be particularly useful to account for potential differences between the encryption/decryption capabilities of the caller and receiver.

The VoIP endpoints can be provided in the form of VoIP soft phones (software running on a computer processor circuit), VoIP hard phones (specially designed hardware phones and circuits) and/or VoIP adapter devices (specially designed hardware that provides an interface between an IP network and a standard public switch telephone network telephone device). Other types of VoIP endpoints are also possible including, but not necessarily limited to, mobile devices/telephones with Internet access.

Embodiments are directed toward such a system in which the call control server 402 is provided by a computer server. The call control server 402 can be configured and arranged to perform a number of call related functions. For instance, the call control server 402 can be configured and arranged to receive a connection request for a VoIP call initiated by calling endpoint 410. The connection request can include a source identifier (corresponding to calling endpoint 410) and a destination identifier (corresponding to answering endpoint 412). The call control server 402 responds to the connection request by accessing a list of the available proxy servers 414. The list includes a number of different proxy servers that are located at geographically disparate locations relative to one another, although some of the proxy servers can be located within a common location/data center.

The call control server 402 can also be configured to execute a selection algorithm that processes variables for the proxy servers 414 in the list. In response to the selection algorithm, the call control server 402 is configured to select a particular proxy server from the list. In response to the selection, the call control server 402 can direct an endpoint to route audio (and also video or other) media for the VoIP call through the particular proxy server. The call control server 402 can also be configured to maintain a call state for the VoIP call while the voice media is routed through the particular proxy server.

Consistent with certain embodiments call control server 402 can be configured and arranged to provide call management options to one or more participants in the VoIP call. The call management options can include features such as, but not necessarily limited to: call forwarding or translation to route calls to a particular telephone number to a specific device; hunt groups that allow multiple endpoints to be linked to a single telephone number and further allow for rules to be designed for call routing within the hunt group; call holding or call queuing; caller identification (ID); voice mail; interactive voice responses; fax to email; and/or call recording.

Various embodiments of the present disclosure are directed toward proxy servers that can be configured to provide a number of functions, and one such function is NAT traversal service. This function is based upon the recognition that NAT can interfere with end-to-end connectivity between two endpoints attempting to establish a VoIP call. Embodiments of the present disclosure further recognize that NAT traversal can be accomplished using several different techniques, however, NAT behavior is not standardized and therefore certain techniques may not work with a particular NAT. Accordingly, more particular aspects of the present disclosure are directed toward the selection of a proxy server based upon the existence and type of NAT for one or more of the endpoints and the NAT traversal capabilities of the proxy servers in the list of proxy servers.

Another function of the proxy servers may include the ability to transcode audio/voice/video media. The transcoding provides a gateway/bridge between a source endpoint and a destination endpoint that use different codecs for the VoIP call.

Figure 5:
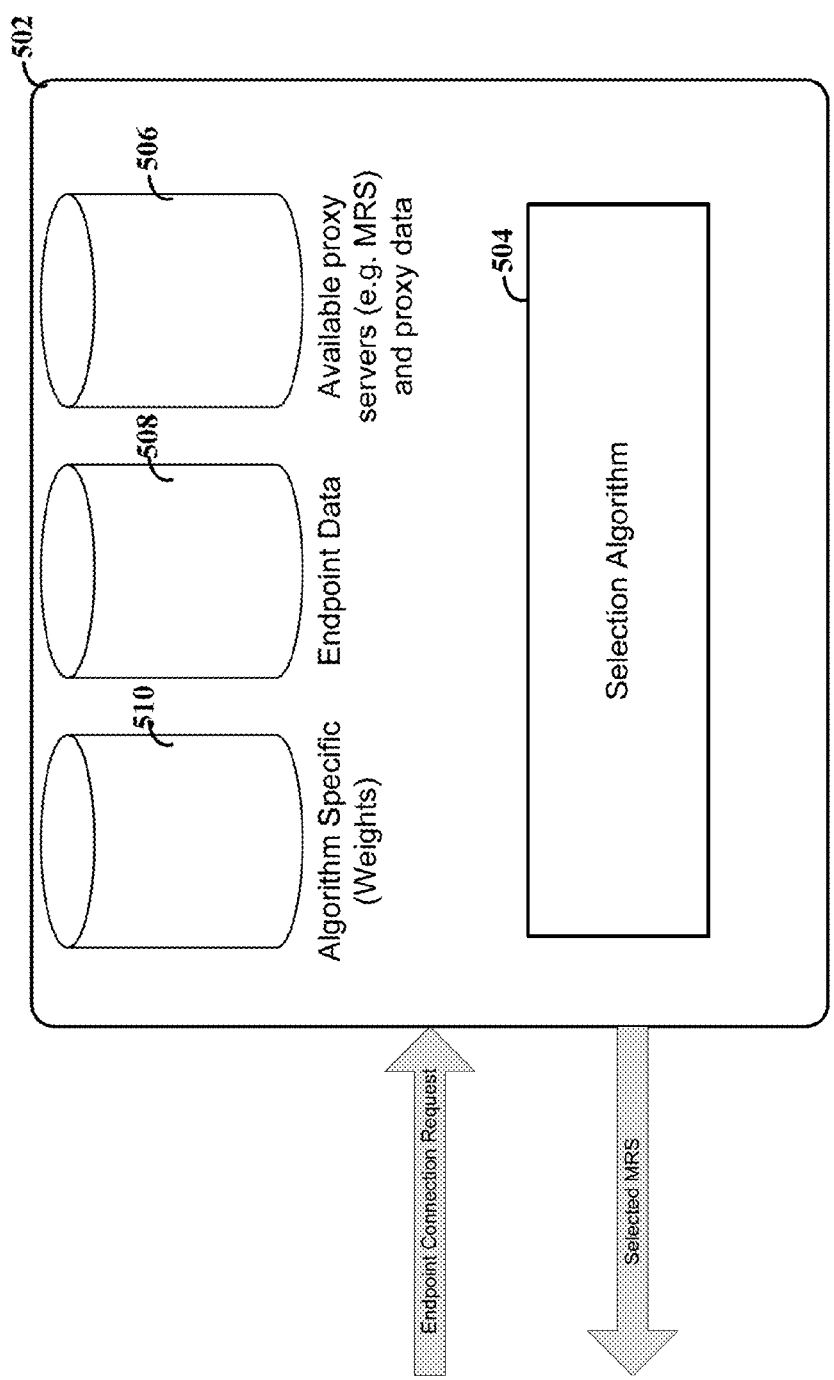
FIG. 5 shows a block diagram for selecting a proxy servers based upon a selection algorithm, consistent with embodiments of the present disclosure.

FIG. 5 depicts a block diagram for selecting a proxy server (e.g., a MRS) based upon a selection algorithm, consistent with embodiments of the present disclosure. Module 502 can be configured and arranged to respond to a call connection request by using a selection algorithm 504 to select one or more proxy servers to complete the call. As discussed herein, there are a number of different inputs that can be used by the selection algorithm 504. Some of the inputs relate to information relative to the proxy server, as shown by database symbol 506. Other ones of the inputs can relate to information relative to one or more of the endpoints, as shown by database symbol 508. Further inputs can be directly related to the selection algorithm 504 (e.g., different weights applied to different information/factors), as shown by database symbol 510. Other types of useful information do not necessarily fall within one of these categories, but are not excluded from use in the selection algorithm 504. Moreover, the information can be received from external sources (e.g., as part of the connection request or in response to a query from module 502).

A few non-limiting examples of information include one or more of the number of hops between a source VoIP device and each proxy server, the number of hops between each proxy server and a next known media relay or termination device, the geographic distances between the source VoIP device, each proxy server and the next known media relay or termination device, the load of each proxy server, and capabilities of an ISP used in the VoIP call.

Embodiments of the present disclosure allow for the selection algorithm to be dynamically updated according to the current operating conditions. For example, call quality data for previous VoIP calls can be provided. This call quality data can be correlated to particular aspects of the related VoIP, e.g., the participating proxy servers, the participating endpoints, the participating ISPs and/or the relevant geographic locations of different components. Future calls can then be routed by correlating past call quality with similar aspects of the future calls and then selecting a proxy server with expected acceptable call quality.

Various embodiments of the present disclosure relate to the ability for dynamic modifications to be made to the list of available proxy servers. The changes can reflect new proxy servers being added or removed. They can also reflect proxy servers that become available when new agreements are reached between with the system operator and entities that provide one or more proxy servers.

Further embodiments of the present disclosure are directed toward the use of priority ratings for the VoIP calls. The priority rating can indicate preferential treatment for certain callers so that they are provided access to proxy servers with higher call quality before access is provided to callers with a lower priority. The priority can be based upon a number of factors, one of which is the subscription option of the caller. For instance, a caller can subscribe to a premium service or to a discount service and receive different priorities accordingly. In this manner, the priority can be based upon a subscription type that is associated with one or more of the source identifier and the destination identifier for the VoIP call.

Another priority basis could be the source or destination for the call. As an example, the VoIP system can be configured and arranged to provide a high priority rating in response to the destination identifier indicating that the VoIP call is for emergency services.

Certain embodiments recognize that the use of a geographically disparate proxy server can sometimes raise issues of compliance with different laws of different countries. Accordingly, the selection algorithm can include acceptable and/or unacceptable proxy server locations based upon the applicable laws of a country involved in a particular call.

Figure 6:
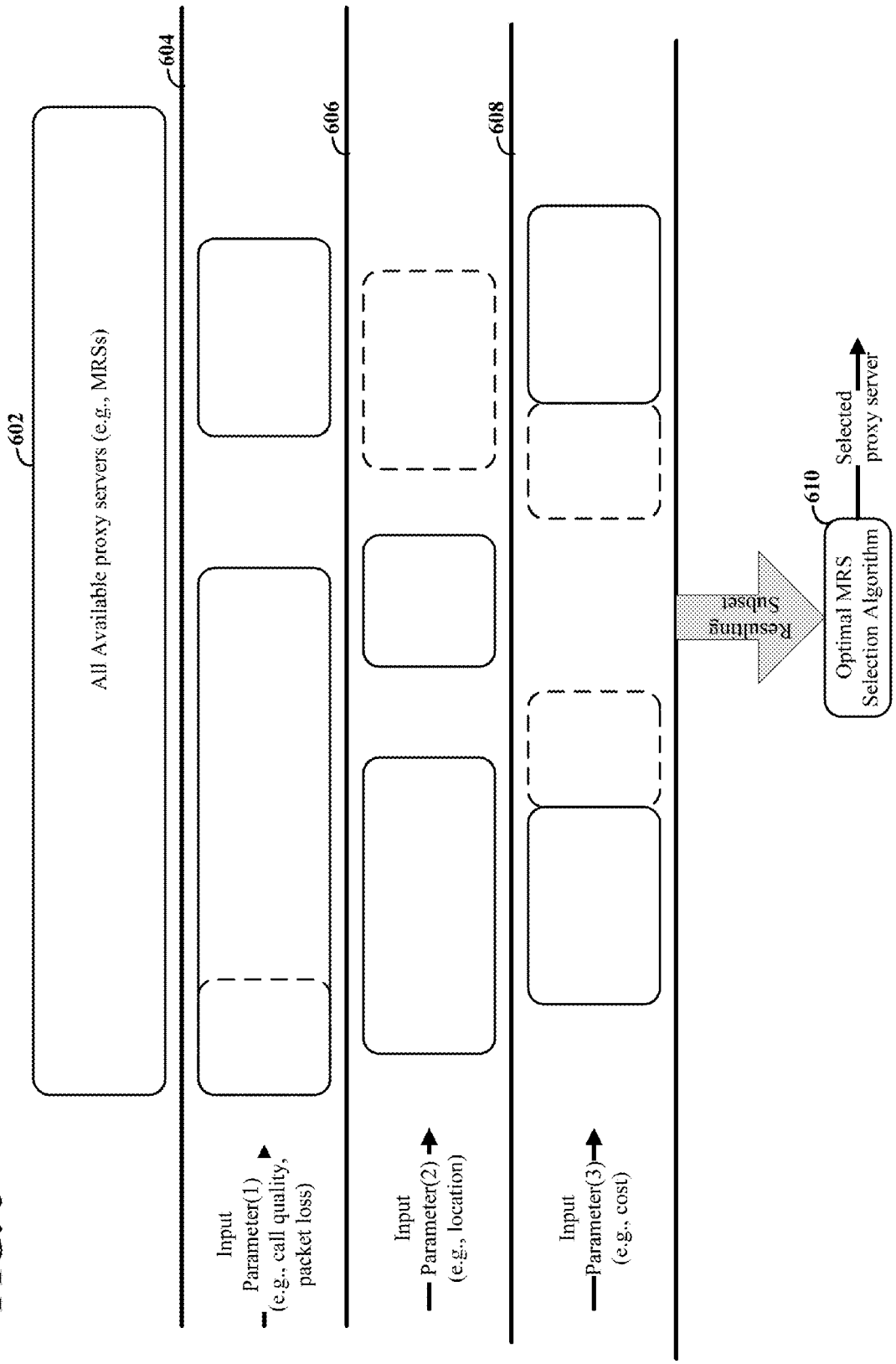
FIG. 6 shows a block diagram representing aspects of a selection algorithm, consistent with embodiments of the present disclosure.

FIG. 6 depicts a block diagram representing aspects of a selection algorithm, consistent with embodiments of the present disclosure. FIG. 6 shows a set of blocks representing the use of a selection algorithm that first narrows the selection of the total available proxy servers 602 (e.g., MRSs) to one or more subsets 604, 606, and 608. Each block within subsets 604, 606, and 608 represents a portion of the available proxy servers 602. Overlapping portions of the different subsets (in the vertical direction) represent proxy servers that meet both respective criteria and that can be passed onto the optimal selection algorithm 610.

The subsets can be selected by narrowing the available proxy servers to those proxy servers having an acceptable call quality, and then selects between the narrowed subset using other parameters (e.g., load balancing or cost). Performance metrics for the call quality can include various different factors that affect aspects such as packet loss, jitter and delay. In certain embodiments, the size of the subset can be controlled by an adjustable input parameter that defines the acceptable parameters for the subset. For instance, the input parameter for subset 604 could be based upon a maximum number of hops in the transmission path. The algorithm can also be configured to narrow the selection to a subset 606 based upon geographic location (e.g., where the input parameter specifies a maximum distance) or cost 608 (e.g., where the input parameter specifies a maximum cost for using the proxy server). Various other subsets can be used alone or in combination to provide a quick and efficient selection technique.

The size of the subsets can be varied according to the respective input parameters. Accordingly, the dotted portions of the subsets 604, 606, and 608 represent either an expansion or reduction in the subset size. The size of the subsets can be varied for a variety of reasons, one of which is that the number of proxy servers satisfying each of the input parameters may be too high or too low. The subsets can also each be chosen using a combination of input parameters and a simple or complex relationship can be established between the different input parameters.

In certain embodiments, the algorithm can be configured to recognize the interactions between the different parameters. For instance, the latency of an individual packet may be relatively low for a particular transmission route; however, the call quality may still be very poor when there is high packet loss. Thus, the call control server may select a proxy server having a higher latency and a lower packet loss, relative to other proxy servers.

Other aspects of the present disclosure utilize the ability of the call control server to dynamical adjust the operating parameters of the call. For instance, if a proxy server is capable of dynamically switching codecs during a call, the call control server can direct the proxy server to change codecs in response to a real-time evaluation of the call quality. Moreover, the call control server can be configured to select a proxy server based upon the capability of a proxy server to dynamically switch between codecs. For instance, a connection route between the endpoints and first proxy server may exhibit a high packet loss but a significantly lower latency. The algorithm can be configured to select the higher packet loss route and switch to a more packet loss tolerant codec like Internet Low Bitrate Codec (ILBC), assuming the first proxy server and the endpoints are capable of using such a codec. Other (non-limiting) examples of voice codecs include G.711, G.723, G.726, G.728, and G.729.

Accordingly, various embodiments factor in the ability of a proxy server to provide packet loss concealment (PLC), which can mitigate for lost packets. Different codecs provide different mechanisms for PLC, each having different levels of effectiveness. For instance, certain codecs can account for dead time caused by a lost packet by playing a filler sound (e.g., as sound based upon the last received audio sample). Another factor that can be analyzed is packet size/interval which defines the size of media content that is contained within a single packet. Although a larger packet interval can provide certain benefits (e.g., reduce overhead/bandwidth) it can also accentuate call quality problems caused by packet loss.

Human perception places limits on the amount of latency that is acceptable before voice quality degradation becomes noticeable. For instance, an effective latency of less than about 150 ms from when voice is detected by a microphone to when the voice is reproduced by a speaker is generally considered sufficient for telephone communications. The algorithm can therefore be configured to budget for the all elements within the transmission path and not just those elements that are contributing to network delay. One such component is a playout buffer. A playout buffer can be used to store received packets in order to introduce an intentional delay packet to provide a synchronous stream. This can help mitigate variable network delays (jitter) by providing constant delays at the endpoint. In certain embodiments, the call control server can select a proxy server as a function of the playout buffer capabilities and settings. Moreover, the call control server can instruct one or both endpoints to adjust the size of their playout buffer according to expected delays from the selected proxy server. In certain embodiments, the call control server can determine whether or not the playout buffer is configured to dynamically adjust its buffer size according to the current network conditions and make a proxy server selection using this determination.

Embodiments of the present disclosure utilize a proxy server selection algorithm that can rank proxy servers according to an objective speech quality testing standard. One such standard is Perceptual Evaluation of Speech Quality (PESQ). PESQ (and other potential testing standards) can analyze the transport stream analysis without requiring knowledge of the audio being transmitted. In other instances, a known reference signal can be generated at an endpoint and then the received signal can be compared against the expected/known reference signal. For the former methodology, quality ratings for (combinations of) proxy servers, call routes, endpoints and ISPs can be generated from actual usage and also in real time for individual calls. For the latter, the endpoints could be configured to generate the reference signal upon initialization. This reference signal can be routed to multiple proxy servers to create a baseline for future selections. Alternatively or in addition, the endpoints can generate reference signals at later points in time (e.g., whether randomly, periodically or in response to a prompt from a call control server). For instance, if a new proxy server is added to the list of available proxy servers, the call control server could request that one or more endpoints transmit a reference signal to the new proxy server and thereby establish a baseline call quality measurement.

Consistent with various embodiments, the call control server can select a subset of proxy servers to be provided to the user device. The user device can then (randomly or based upon locally-available data) select from the subset. In certain instances, the user device can be configured to locally run a quick test for the proxy servers in the subset (e.g., determining packet transit time delay for the proxy servers) and make a selection from this information. Moreover, the user device could maintain the list for future calls to reduce processing demands on the call control server. The call control server could provide a new subset of proxy servers on a periodic basis or in response to a request for update from the endpoint.

Various embodiments may be implemented using a variety of structures and related operations/functions. For instance, one or more embodiments as described herein may be computer-implemented or computer-assisted, as by being coded by software within a coding system as memory-based codes or instructions executed by a computer processor, microprocessor, PC or mainframe computer. Such computer-based implementations are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium, which stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although aspects may be described with reference to individual figures, it will be appreciated that aspects from one figure can be combined with aspects from another figure even though the combination is not explicitly shown or explicitly described as a combination. It is intended that the specification and illustrated embodiments be considered as examples only, with a true scope of the invention being indicated by the following claims.

What is claimed is:

1. An apparatus, comprising:
a plurality of proxy servers located at geographically disparate locations relative to one another and configured and arranged to
relay Voice-over-IP (VoIP) data to and from a plurality of endpoint devices, and
perform network-address-translator traversal services for the plurality of endpoint devices; and
a call control server configured and arranged to:
receive a connection request for a VoIP call, the connection request including a source identifier and a destination identifier;
select a particular proxy server of the plurality of proxy servers using a selection algorithm;
route, in response to the selection, voice media for the VoIP call through the particular proxy server to an endpoint device indicated by the destination identifier; and
maintain a call state for the VoIP call while the voice media is routed through the particular proxy server, wherein each of the plurality of proxy servers is configured and arranged to
relay VoIP data to and from the plurality of endpoint devices through respective mapped paths through a network-address-translator, each of the mapped paths being susceptible to being unmapped by the network-address-translator in response to the mapped path being unused for a threshold duration of time; and
for each of the plurality of endpoint devices, in response to the endpoint device not communicating with the plurality of proxy servers for a duration of time exceeding the threshold duration of time, prompting the endpoint device to transmit one or more messages to the plurality of proxy servers in order to maintain a respective one of the mapped paths through the network-address-translator to the endpoint device, and
in response to the endpoint device initiating one or more Session Initiation Protocol dialogs through a proxy server with which the endpoint device is not registered or subscribed, or with which registration or subscription has expired, operate in a state in which the proxy server is configured and arranged to use the Session Initiation Protocol dialog to maintain a respective one of the mapped paths through the network address translator to the endpoint device until an end of the Session Initiation Protocol dialog by prompting the endpoint device to transmit Session Initiation Protocol dialog communications to the proxy server.

2. The apparatus of claim 1, wherein the plurality of proxy servers is configured and arranged to perform the prompting of the endpoint device within a timeframe sufficient to prevent the respective one of the mapped paths through the network address translator to the endpoint device from being unmapped by the network address translator.

3. The apparatus of claim 1, wherein:
each of the plurality of endpoint devices is configured and arranged to register with one of the plurality of proxy servers; and
each of the plurality of proxy servers includes
a registration/subscription circuit configured and arranged to maintain a list of the plurality of endpoint devices registered with the proxy server, and for each endpoint device on the list, perform the prompting of the endpoint device to maintain the respective one of the mapped paths, through the network address translator, to the endpoint device, and
a routing circuit configured and arranged to relay the communications through mapped paths of the network address translator during VoIP sessions with the plurality of endpoint devices included in the list.

4. The apparatus of claim 1, wherein the plurality of proxy servers is running as Session Initiation Protocol Back-to-back User Agent (SIP B2BUA) servers.

5. The apparatus of claim 1, wherein the plurality of proxy servers is configured and arranged to relay Real Time Protocol messages and Session Initiation Protocol messages to and from the plurality of endpoint devices.

6. The apparatus of claim 1, wherein:
each endpoint device of the plurality of endpoint devices is configured and arranged to register or subscribe with a respective one of the plurality of proxy servers; and
each proxy server of the plurality of proxy servers is further configured and arranged to:
in response to an endpoint device of the plurality of endpoint devices initiating a Session Initiation Protocol dialog through the proxy server, operate in a first state in which the proxy server is configured and arranged to
maintain a timer indicating a duration of time since the endpoint device registered or subscribed with the plurality of proxy servers, and
prompt the endpoint device to transmit a communication to the proxy server in response to the duration of time indicated by the timer exceeding a threshold amount of time.

7. The apparatus of claim 6, wherein the proxy server is configured and arranged to:
add an endpoint device of the plurality of endpoint devices to a list of registered devices upon receiving a Session Initiation Protocol register message or a subscribe message from the endpoint device; and
remove the endpoint device from the list of registered devices in response to either the duration of time indicated by the timer exceeding the threshold amount or a new Session Initiation Protocol dialog being initiated by the endpoint device through another one of the plurality of proxy servers.

8. The apparatus of claim 6, wherein the proxy server is configured and arranged to prompt the endpoint device to transmit a communication to the proxy server by transmitting a Session Initiation Protocol options message to the endpoint device.

9. An apparatus, comprising:
a plurality of proxy servers located at geographically disparate locations relative to one another and configured and arranged to
 relay Voice-over-IP (VoIP) data to and from a plurality of endpoint devices, and
 perform network-address-translator traversal services for the plurality of endpoint devices; and
a call control server configured and arranged to:
 receive a connection request for a VoIP call, the connection request including a source identifier and a destination identifier;
 select a particular proxy server of the plurality of proxy servers using a selection algorithm;
 route, in response to the selection, voice media for the VoIP call through the particular proxy server to an endpoint device indicated by the destination identifier; and
 maintain a call state for the VoIP call while the voice media is routed through the particular proxy server,
each of the plurality of proxy servers being configured and arranged to
 relay VoIP data to and from the plurality of endpoint devices through respective mapped paths through a network-address-translator, each of the mapped paths being susceptible to being unmapped by the network-address-translator in response to the mapped path being unused for a threshold duration of time;
 in response to the endpoint device not communicating with the plurality of proxy servers for a duration of time exceeding the threshold duration of time, prompt the endpoint device to transmit one or more messages to the plurality of proxy servers in order to maintain a respective one of the mapped paths through the network-address-translator to the endpoint device;
register or subscribe with a respective one of the plurality of proxy servers; and
in response to an endpoint device of the plurality of endpoint devices initiating a Session Initiation Protocol dialog through the proxy server, operate in a first state in which the proxy server is configured and arranged to
 maintain a timer indicating a duration of time since the endpoint device registered or subscribed with the plurality of proxy servers, and
 prompt the endpoint device to transmit a communication to the proxy server in response to the duration of time indicated by the timer exceeding a threshold amount of time; and
in response to the endpoint device initiating one or more Session Initiation Protocol dialogs through a proxy server with which the endpoint device is not registered or subscribed, or with which registration or subscription has expired, operate in a second state in which the proxy server is configured and arranged to use the Session Initiation Protocol dialog to maintain a respective one of the mapped paths through the network address translator to the endpoint device until an end of the Session Initiation Protocol dialog by prompting the endpoint device to transmit Session Initiation Protocol dialog communications to the proxy server, wherein the Session Initiation Protocol dialog is initiated by an Session Initiation Protocol invite message.

* * * * *